US008667775B1

(12) United States Patent
Kisska et al.

(10) Patent No.: US 8,667,775 B1
(45) Date of Patent: Mar. 11, 2014

(54) REVERSE FLOW ENGINE CORE HAVING A DUCTED FAN WITH INTEGRATED SECONDARY FLOW BLADES

(75) Inventors: Michael K. Kisska, Long Beach, CA (US); Norman H. Princen, Long Beach, CA (US); Mark S. Kuehn, Gilbert, AZ (US); Gary B. Cosentino, Lancaster, CA (US)

(73) Assignee: The Boeing Company, Chicago, IL (US)

( * ) Notice: Subject to any disclaimer, the term of this patent is extended or adjusted under 35 U.S.C. 154(b) by 1509 days.

(21) Appl. No.: 12/536,426

(22) Filed: Aug. 5, 2009

(51) Int. Cl.
*F02K 3/02* (2006.01)
*B64C 11/14* (2006.01)

(52) U.S. Cl.
USPC ............. 60/226.1; 60/262; 60/39.83; 60/269; 416/94

(58) Field of Classification Search
USPC .......... 60/39.162, 39.83, 226.1, 226.2, 226.3, 60/262, 268, 269, 806; 415/101, 102, 103; 416/93 R, 94, 175, 203
See application file for complete search history.

(56) References Cited

U.S. PATENT DOCUMENTS

| | | | | | |
|---|---|---|---|---|---|
| 1,414,418 | A | * | 5/1922 | Jaray | 416/94 |
| 1,611,658 | A | * | 12/1926 | Magni | 416/94 |
| 1,927,921 | A | * | 9/1933 | Courtney | 416/94 |
| 2,330,622 | A | * | 9/1943 | Ramshorn | 416/94 |
| 2,407,223 | A | * | 9/1946 | Caldwell | 123/41.65 |
| 2,504,181 | A | * | 4/1950 | Constant | 60/226.1 |
| 2,546,420 | A | * | 3/1951 | Barr | 60/39.17 |
| 2,622,688 | A | * | 12/1952 | Lee | 416/94 |
| 2,704,434 | A | * | 3/1955 | Schmitt | 60/761 |
| 2,726,725 | A | * | 12/1955 | Nichols | 416/94 |
| 3,131,536 | A | * | 5/1964 | Snell | 60/226.1 |
| 3,253,406 | A | * | 5/1966 | Grieb | 60/262 |
| 3,494,539 | A | * | 2/1970 | Littleford | 416/171 |
| 3,549,272 | A | * | 12/1970 | Bouiller et al. | 416/166 |
| 3,589,132 | A | * | 6/1971 | Du Pont | 60/262 |
| 3,703,081 | A | * | 11/1972 | Krebs et al. | 60/226.1 |
| 3,779,486 | A | * | 12/1973 | Lewis et al. | 244/53 R |
| 3,859,785 | A | * | 1/1975 | Leto et al. | 60/802 |
| 3,867,813 | A | * | 2/1975 | Leibach | 60/225 |
| 3,903,690 | A | * | 9/1975 | Jones | 60/39.08 |
| 3,916,620 | A | * | 11/1975 | Ketley | 60/226.2 |
| 4,005,575 | A | * | 2/1977 | Scott et al. | 60/226.1 |
| 4,037,409 | A | * | 7/1977 | Leibach | 60/413 |
| 4,380,897 | A | * | 4/1983 | Zaba | 60/802 |
| 4,765,135 | A | * | 8/1988 | Lardellier | 60/226.2 |
| 5,103,635 | A | * | 4/1992 | Lardellier | 60/226.1 |
| 5,105,618 | A | * | 4/1992 | Lardellier | 60/226.1 |
| 5,562,419 | A | * | 10/1996 | Crall et al. | 416/190 |
| 5,816,042 | A | * | 10/1998 | Guinan et al. | 60/226.1 |
| 6,102,329 | A | * | 8/2000 | Guinan et al. | 244/53 R |
| 6,217,283 | B1 | * | 4/2001 | Ravenhall et al. | 416/2 |
| 6,494,032 | B2 | * | 12/2002 | Udall et al. | 60/223 |
| 6,751,946 | B2 | * | 6/2004 | Li | 60/269 |

(Continued)

*Primary Examiner* — Gerald L Sung
*Assistant Examiner* — Michael B Mantyla
(74) *Attorney, Agent, or Firm* — Felix L. Fischer

(57) ABSTRACT

Secondary air flow is provided for a ducted fan having a reverse flow turbine engine core driving a fan blisk. The fan blisk incorporates a set of thrust fan blades extending from an outer hub and a set of integral secondary flow blades extending intermediate an inner hub and the outer hub. A nacelle provides an outer flow duct for the thrust fan blades and a secondary flow duct carries flow from the integral secondary flow blades as cooling air for components of the reverse flow turbine engine.

14 Claims, 9 Drawing Sheets

(56) References Cited

U.S. PATENT DOCUMENTS

| | | | |
|---|---|---|---|
| 6,868,664 B2 * | 3/2005 | Albero et al. | 60/224 |
| 7,322,180 B2 * | 1/2008 | Lapergue et al. | 60/226.1 |
| 7,475,549 B2 * | 1/2009 | Alexander et al. | 60/772 |
| 7,490,460 B2 * | 2/2009 | Moniz et al. | 60/268 |
| 2006/0102780 A1 * | 5/2006 | Parks | 244/53 B |
| 2008/0095628 A1 * | 4/2008 | Suciu et al. | 416/170 R |

* cited by examiner

REVERSE FLOW ENGINE CORE HAVING A DUCTED FAN WITH INTEGRATED SECONDARY FLOW BLADES

REFERENCE TO FEDERALLY SPONSORED RESEARCH

This invention was made in the performance of work under NASA Contract Number FA8650-05-2-3503 and is subject to the provisions of Section 305 of the National Aeronautics and Space Act of 1958 (72 Stat.435: 42 U.S.C.2457.).

REFERENCE TO RELATED APPLICATIONS

This application is copending with application Ser. No. 12/536,338 filed substantially concurrently herewith entitled COANNULAR DUCTED FAN.

BACKGROUND INFORMATION

1. Field

Embodiments of the disclosure relate generally to the field of ducted fan engines and more particularly to embodiments for integral central blading in the fan for secondary air ducting for cooling of components in a reverse flow turbine engine.

2. Background

Ducted fan engines provide high bypass ratios for an efficient propulsion system for air vehicles. By nature, the fan element provides thrust using air displaced through the nacelle or duct surrounding the fan. In most cases, the motive element for the fan, a reciprocating engine or turbojet core is axially aligned with the fan and the fan airflow is directed around the engine or core. Configurations with tractor or pusher style fan/engine integrations may be employed.

Use of a tractor style engine and fan arrangement may be particularly beneficial where integration of the engine and fan in a blended wing body configuration is desired. A turboprop engine provides shaft connection in a tractor arrangement which provides an attractive integrated configuration. However, turboprop engines typically employ a reverse flow arrangement. Use of such reverse flow turbine engines in a ducted fan may result in complex flow arrangements or reduced efficiencies due to the airflow requirements of the engine.

It is therefore desirable to provide a ducted fan having multiple airflow paths to accommodate reverse flow turbine engines or other secondary air requirements in a ducted fan configuration.

SUMMARY

Exemplary embodiments provide a ducted fan having an engine core driving a fan blisk. The fan blisk incorporates a set of thrust fan blades extending from an outer hub and a set of integral secondary flow blades extending intermediate an inner hub and the outer hub. A nacelle provides a first flow duct for the thrust fan blades and a secondary flow duct carries flow from the integral secondary flow blades for cooling of components of the engine core.

In one exemplary configuration, an embodiment incorporates reverse flow turbine ducted fan with a reverse flow turbine engine core including a power shaft driven through a gear case and having a fan attachment shaft. A fan blisk is attached to the fan attachment shaft and spaced from the gear case by a pressure plate engaging a flange. The fan blisk incorporates a set of thrust fan blades extending from an outer hub, a set of integral secondary flow blades extending intermediate an inner hub and the outer hub. The flange spans the inner hub with the gear case and flange forming a cooling air plenum. A nacelle provides a first flow duct for primary air flow from the thrust fan blades and a plurality of interconnected base gores for stator blades extending to the nacelle provide a structure to support a gear case shroud aligned with the outer hub and carrying secondary air flow from the integral secondary flow blades. An air diffuser extends from the gear case shroud and a tail cone having inlets positioned to receive exit flow from the diffuser provides inlet combustion air for the reverse flow turbine engine core. A concentric spinner engages the inner and outer hub for secondary air flow.

A method for fabrication and operation of the exemplary embodiments includes machining thrust blades intermediate an outer hub and a nacelle inner radius in a fan blisk and machining secondary flow blades intermediate an inner hub and the outer hub. The fan blisk is then mounted on a fan shaft and a nacelle is provided for flow from the thrust blades. A secondary flow path is provided for flow from the secondary flow blades. In one aspect of the method, machining the attachment flange in the inner hub is accomplished for relief volumes and weight reduction apertures.

For specific embodiments, the method provide for improved operation of a reverse flow turbine engine by providing a fan blisk with primary air flow and secondary air flow. Primary flow from the blisk is routed through a nacelle for thrust while secondary flow from the blisk is routed through a plenum. Airflow from the plenum may then be employed for cooling components of the reverse flow turbine engine. The fan blisk with primary air flow and secondary air flow is formed with thrust flow blades on the blisk between an outer hub and the nacelle secondary flow blades on the blisk between an inner and outer hub.

Mounting a concentric spinner with inner cap and outer toroidal cap to the inner and outer hubs respectively provides for entering flow into the secondary flow blades. Additionally, mounting the fan blisk on a fan shaft spaced from an engine core by a pressure plate forms a plenum. Secondary flow is then directed around a gear case for cooling. Additionally, secondary airflow is received into the plenum to be drawn into the gear case by a cooling fan.

Where the cooled component is a gear case, cooled supporting the plenum as a gear case shroud is accomplished with stators extending from the nacelle.

A diffuser is also provided for segregating thrust and secondary flow exiting the gear case shroud. A tail cone is provided having inlets positioned to receive exit flow from the diffuser to provide inlet combustion air for the reverse flow turbine engine.

The features, functions, and advantages that have been discussed can be achieved independently in various embodiments of the present invention or may be combined in yet other embodiments further details of which can be seen with reference to the following description and drawings

DETAILED DESCRIPTION

Figure 1:
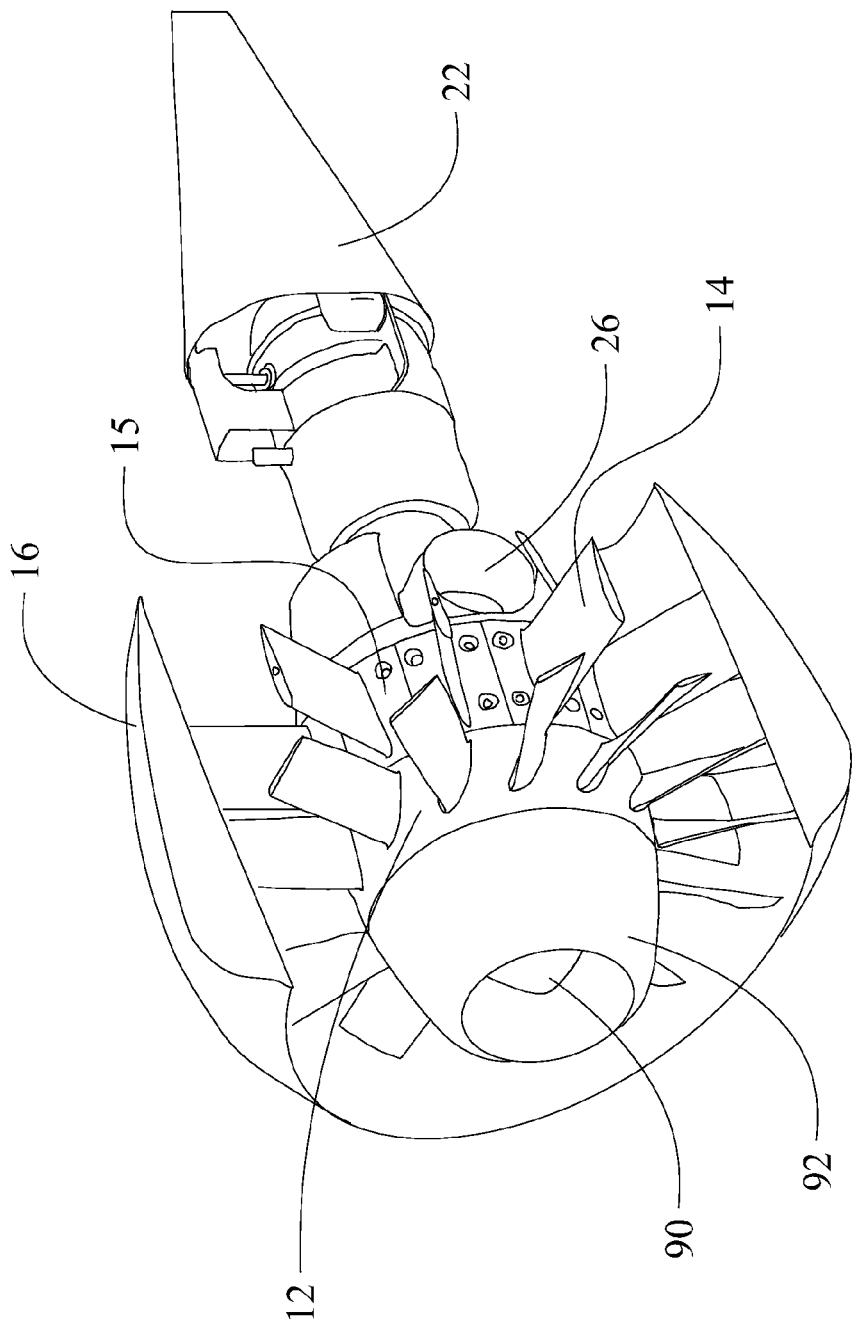
FIG. 1 is an isometric partial section view of an embodiment of a fan blisk integration with a reverse flow turbine engine.

The embodiments described herein disclose a ducted fan with integral central blading to provide alternate non-propulsive air flow for use associated with a reverse flow turbine engine. An exemplary engine for the embodiment disclosed herein is a JetCat SPT5 turboprop produced by JetCat USA, 4250, Aerotech Center Way Bldg. G Paso Robles, Calif. 93446. FIG. 1 shows an embodiment employing a reverse flow turbine engine core 10 driving a fan blisk 12. Stators 14 extending from base gores 15 provide aerodynamic flow control as well as structural continuity with a nacelle 16.

Figure 2:
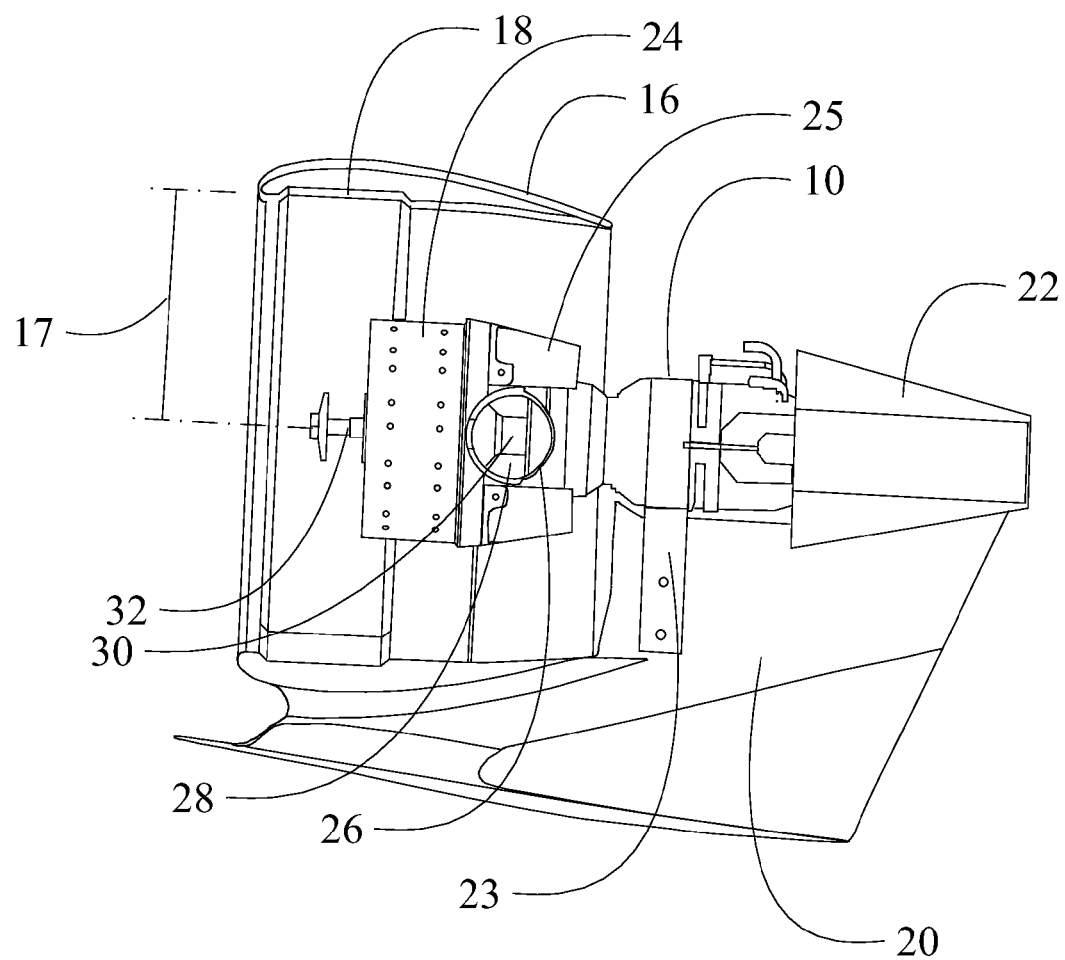
FIG. 2 is a side section view of the embodiment of FIG. 1 with the fan blisk and stator blades eliminated for clarity.

As best seen in FIG. 2, an integral fan shroud 18 is carried by the nacelle 16 providing an inner radius 17 of the nacelle closely matched to the fan thrust blade tip radius for maximized performance. The fan shroud may also provide burst protection in the event of blade separation. The nacelle which provides ducting of the primary thrust air flow from the fan thrust blades is supported by a pylon 20 which also supports the engine core with a clamp bracket 23. A tail cone 22 with inlets for the engine core is supported from the engine core as will be described in greater detail subsequently. Secondary flow from the secondary flow blades in the fan blisk is separated from the primary flow by ducting and is available for usage associated with the engine or alternative secondary air flow requirements. Alternative exemplary uses of the secondary flow may be as bleed air for pressurization or pneumatic actuation systems, or lift control such as boundary layer injection.

Figure 7:
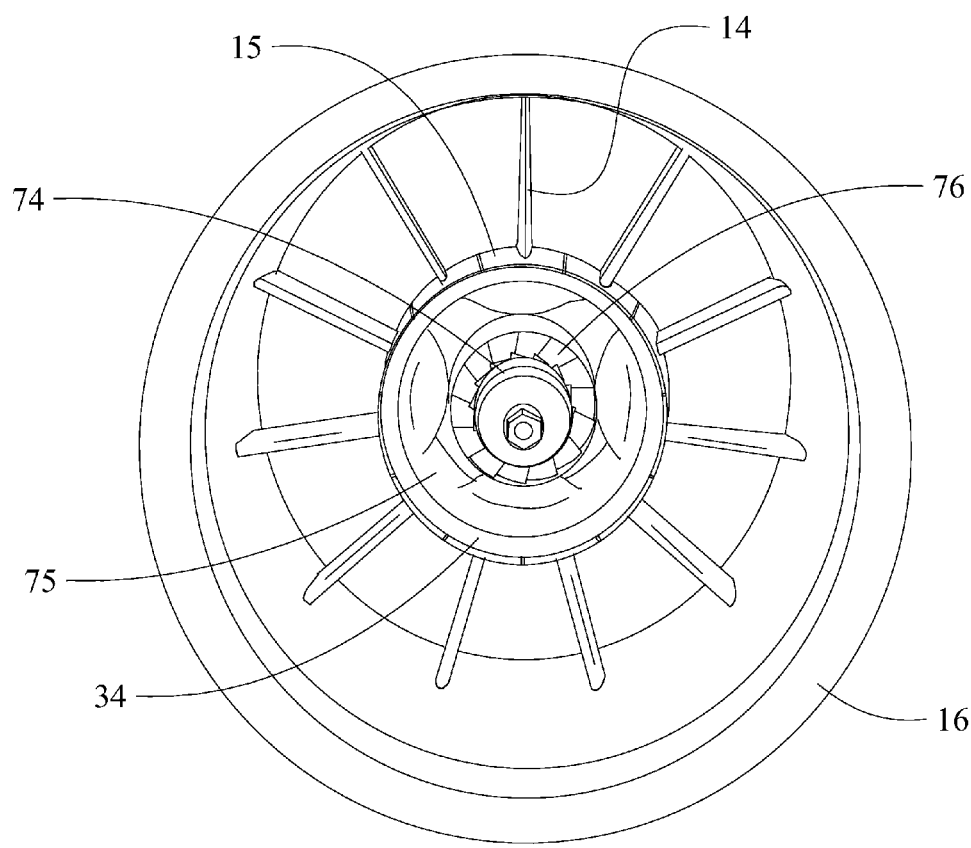
FIG. 7 is a front pictorial view of the nacelle, stator blades, gear case shroud and gear case cooling fan with the fan blisk eliminated for clarity; and, FIG. 8 is a flow chart of a method of implementing the embodiment disclosed herein.

In the embodiment shown, stator base gores 15 integrally form or are attached to a gear case shroud 24, as will be further described with respect to FIG. 7, as the secondary air flow duct. Shaping of the stator base gores provides appropriate aerodynamics for the thrust flow. A flow diffuser 25 extends from the gear case shroud for the purpose of internal aerodynamic efficiency. Exhaust ports 26 from an exhaust plenum 28 for the reverse flow engine core with flow elbows removed in FIG. 2 allow visibility of the power shaft 30 from the engine core extending through the exhaust plenum. A fan shaft 32 extends from the drive gears in the gear case to engage the fan blisk.

As an exemplary usage of the disclosed embodiment, the configuration of FIG. 2 is particularly adapted to be employed in, but not limited to, a blended wing body application such as the Boeing X-48B. Additional applications/uses for turbofans incorporating the embodiments defined herein include: Radio Controlled (hobby) aircraft, Unmanned Aerial Vehicles (UAVs), Remotely Piloted Vehicles (RPV5), Drones and potentially piloted aircraft.

Figure 3:
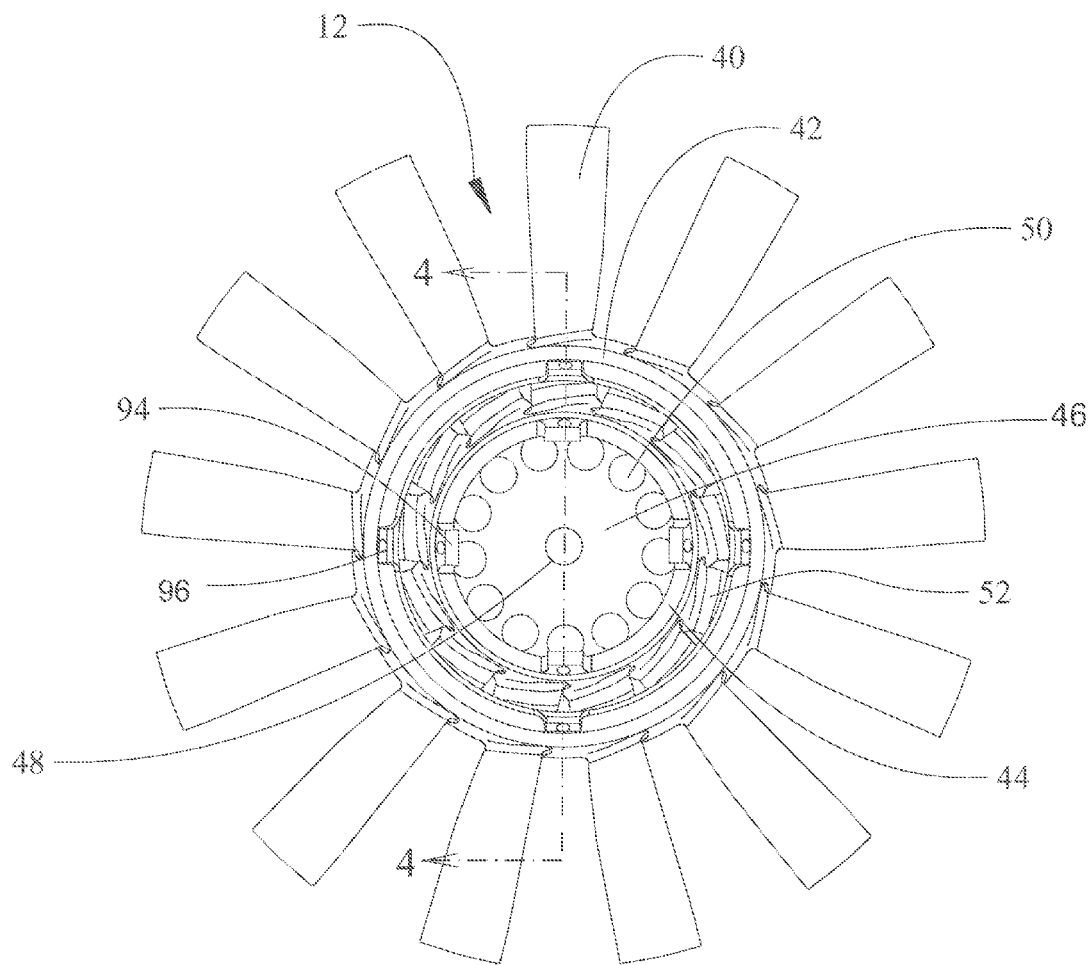
FIG. 3 is a front view of the fan blisk of the embodiment of FIG. 1 with integral cooling blades.
Figure 4:
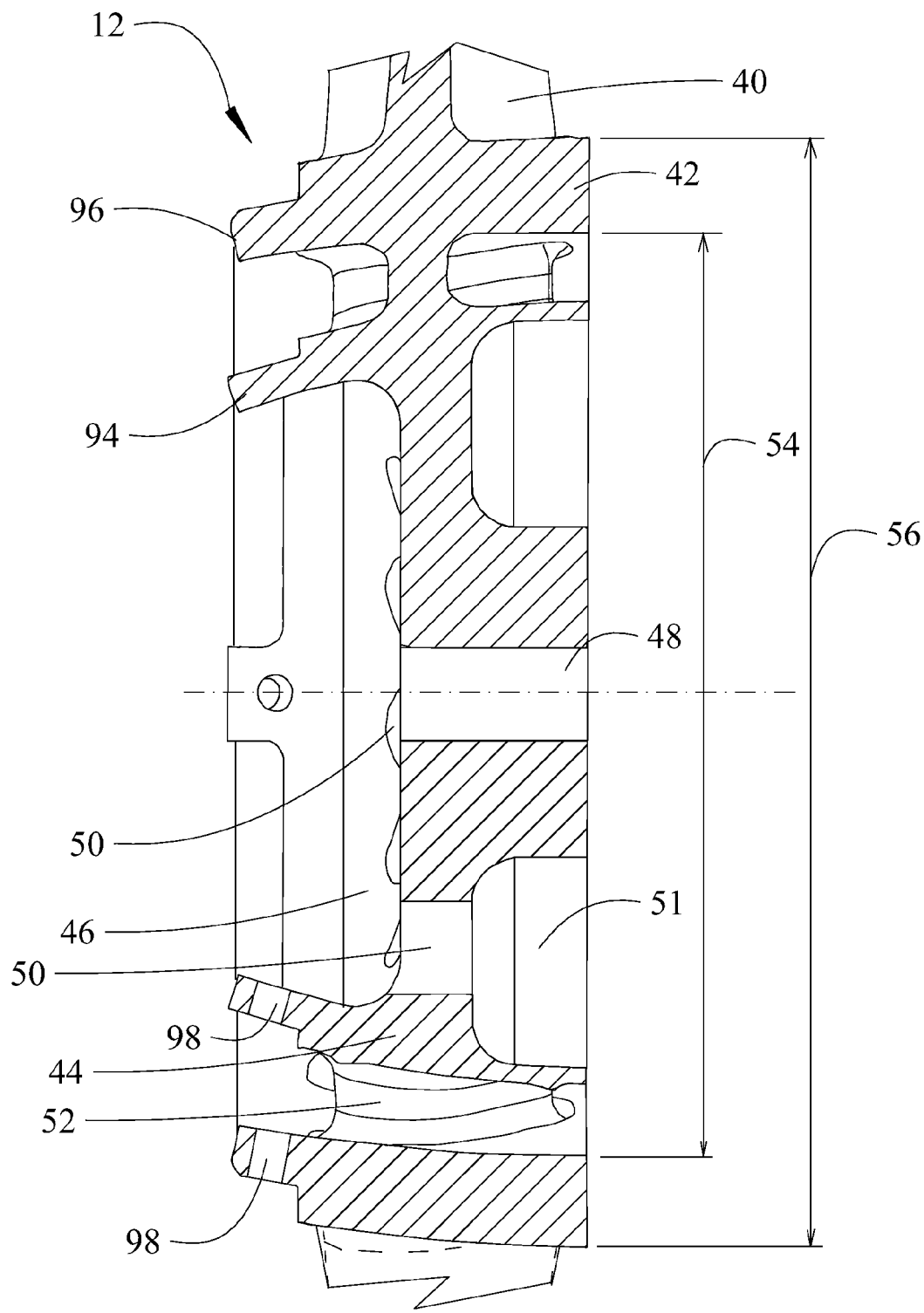
FIG. 4 is a side section view of the fan blisk of FIG. 3 along line 4-4.

The fan blisk 12 is shown in detail in FIGS. 3 and 4. For the exemplary embodiment shown a 12.0 inch diameter blisk is employed. Multiple thrust blades 40 extend from an outer hub 42. An inner hub 44 supports an attachment flange 46 which spans the inner hub as a web and incorporates a central bore 48 to receive fan shaft 32. Optional weight reduction apertures 50 are provided in the attachment flange. Integral secondary flow blades 52 extend between inner hub 44 and outer hub 42, providing structural continuity for supporting the outer hub and providing a secondary air flow, which for the embodiment shown is employed as cooling airflow for gear case 24. Outer hub 42 has the same exiting inner diameter 54 and outer diameter 56 as the inlet of gear case shroud 24. Airflow generated by the integral secondary flow blades flows from the fan blisk through the gear case shroud and gear case itself, as will be described in greater detail subsequently, and exits through the flow diffuser 25. Use of a prime number of fan blades is employed to minimize harmonic resonance in the fan blisk 12. The fan blisk described for the exemplary embodiment of the drawings uses the prime number thirteen fan blades. Alternate (non prime) blade counts as well as fan diameters ranging from 9.0 inches to 14.0 inches may also be employed to meet the intended thrust requirements or alternative embodiments.

Figure 5:
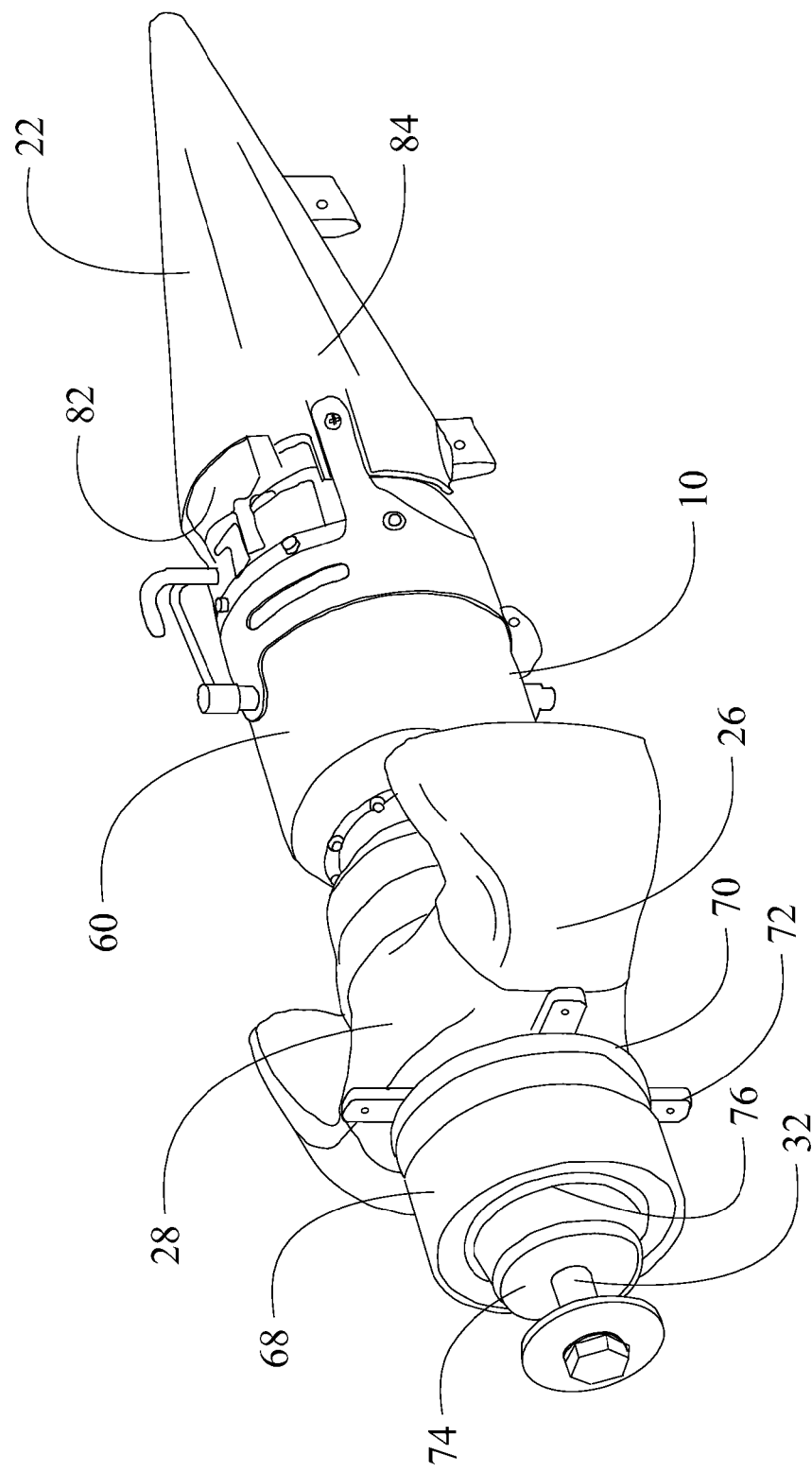
FIG. 5 is an isometric view of the reverse flow turbine engine showing the gear case and tail cone details.
Figure 6:
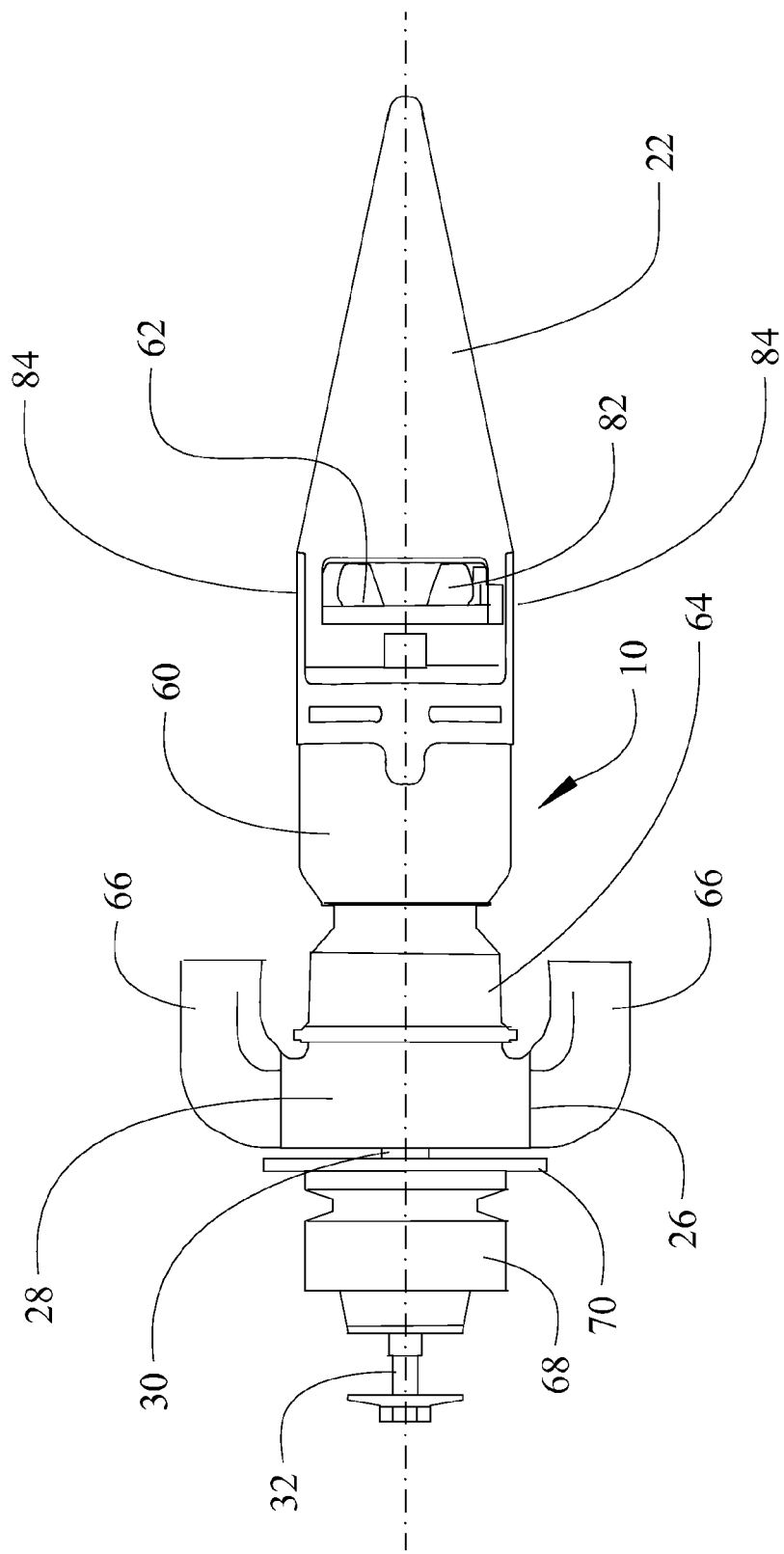
FIG. 6 is a top view of the reverse flow turbine engine of FIG. 5.
Figure 6A:
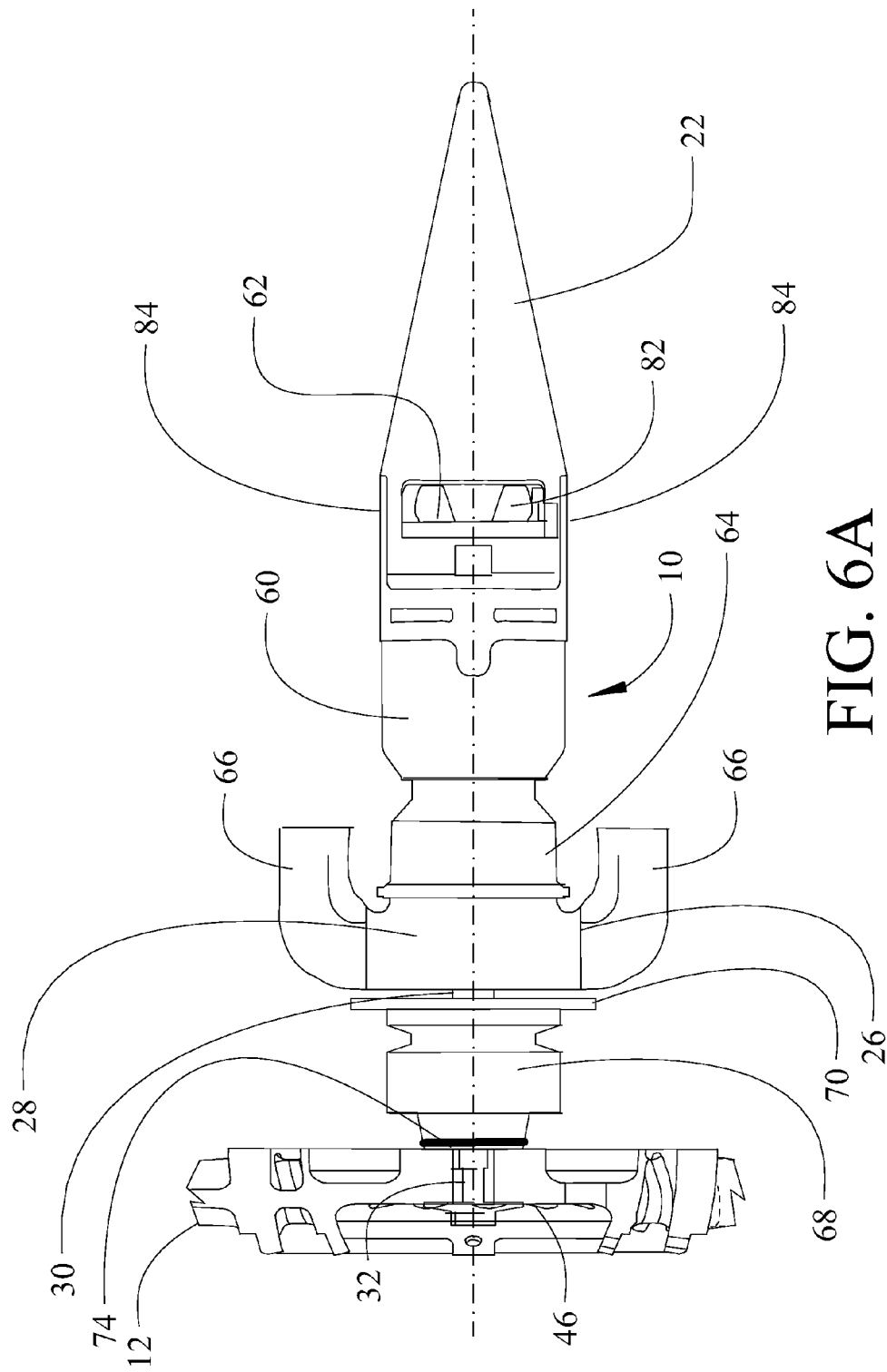
FIG. 6A is a top view of the reverse flow turbine engine with a section view of the fan blisk as shown in FIG. 4 added for clarity of the assembly.

As shown in FIGS. 5 and 6, the reverse flow turbine engine core 10 employs a compressor and turbine section 60 with an annular inlet 62 at the rear of the core for combustion air. Expander 64 carries the exhaust gases to the exhaust plenum 28 for outlet through exhaust ports 26. Exhaust elbows 66 direct the exhaust gas flow rearward for thrust recovery. Power shaft 30 extends to planetary reduction gearing in gear case 68 to provide power to the fan shaft 32 to drive the fan blisk as previously described. A support flange 70 with attachment lugs 72 provides forward structural attachment for the engine core, which in the embodiment shown are attached to the gear case duct. A pressure plate 74 is provided for mounting of the fan blisk which spaces the fan blisk mounting flange 46 from the gear case. A cooling fan 76 is integrated in the gear case and receives a portion of the secondary air for internal cooling flow as will be described subsequently.

FIG. 7 shows gear case shroud 34 supported by stator base gores 15 with multiple stator blades 14 extending to the nacelle 16. As with the prime numbered blade count employed in the fan blisk described previously, the embodiment disclosed employs a prime number of stator blades also to minimize harmonic resonances. For the embodiment shown, eleven stator blades 14 are employed. Cooling airflow from the integral secondary flow blades in the fan blisk is directed through the gear case shroud cooling the outer wall of the gear case. Additionally, airflow is drawn into the volume aft of the blisk attachment pressure plate 74 which forms a plenum 75 for flow entrainment by fan 76 into the gear case. The pressure plate is spaced forward from fan 76 in the gear case front face and in combination with volume cutouts 51 in the blisk flange provides volume for the plenum 75. Flow from the integral secondary flow blades provides pressurization of the plenum assisting flow entrainment by cooling fan 76. As with the blisk, alternate stator blade counts and diameters may also be employed to meet the thrust requirements of alternative embodiments.

As best seen in FIG. 2, cooling flow from the gear case shroud then exits the flow diffuser 25. Tail cone 22, as best seen in FIGS. 5 and 6, includes inlets 82 in the upper and lower quadrants of the profile.

The diffuser minimizes aerodynamic losses of the thrust flow by controlling the flow expansion aft of the stators between the inner geometric profile of the nacelle and outer profile of the diffuser. Aft of the secondary air plenum, the secondary air continues to flow between the outer profile of the engine and inner profile of the diffuser which provides an outer boundary for the secondary flow until the thrust flow is expanded sufficiently for mixing with the secondary flow. At the end of the diffuser, the thrust and secondary flows are combined to provide a single flow path as the air exits the nacelle. A portion of the combined flow is ingested into the engine as inlet flow for combustion air through inlets 82 to the engine core inlet 62. Tail cone 22 is closed or flattened in the lateral quadrants 84 of the tail cone forward profile to reduce ingestion of hot exhaust gas from the horizontally oriented exhaust elbows 66.

Returning to FIG. 1, a dual concentric spinner having inner cap 90 and an outer toroidal cap 92 is attached to the inner and outer hubs 44, 42 of the fan blisk using attachment stubs 94, 96 each having a bore 98 (as seen in FIGS. 3 and 4) to receive a securing fastener. Secondary airflow is drawn through the dual concentric spinner for flow entrainment by the integral secondary flow blades. Inner spinner cap 90 may contribute to the plenum volume for the gear case cooling air with flow through weight reduction apertures 50 as best seen in FIG. 4.

Figure 8:
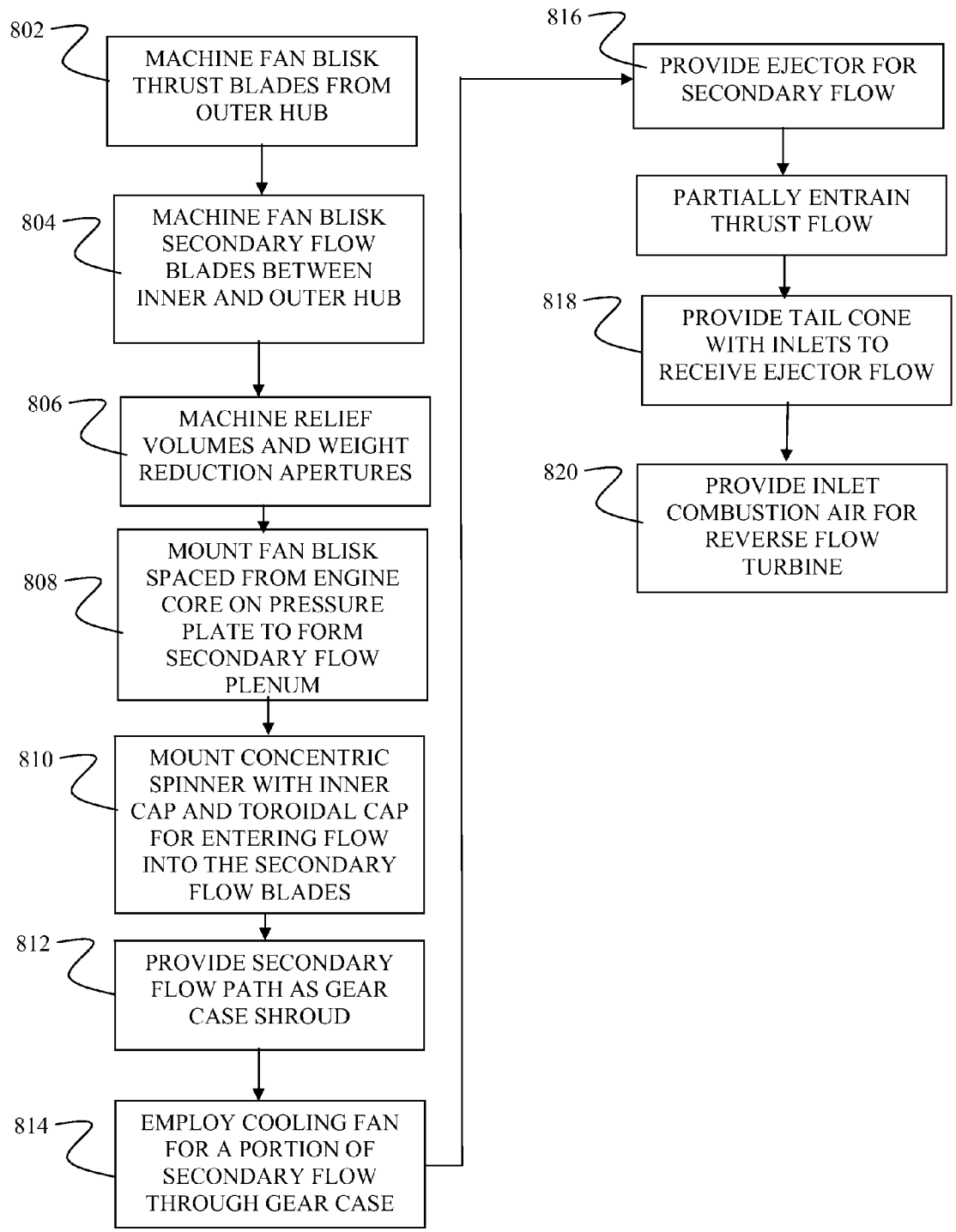

A method for providing secondary airflow for a reverse flow turbine engine and exemplary use of the secondary flow for the embodiment disclosed herein is outlined in FIG. 8. A fan blisk is formed by machining nylon thrust blades intermediate an outer hub and a nacelle inner radius, step 802. Additional materials such as aluminum and manufacturing processes such as molding, diffusion bonding, super plastic forming, autoclaving, selective laser sintering (SLS) or other rapid prototyping technologies may be employed to manufacture the blisk to its outer mold line specifications. Secondary flow blades are formed intermediate an inner hub and the outer hub, step 804. The secondary flow blades may be formed using alternative processes as previously described for the thrust blades. The attachment flange engaging the inner hub may be additionally machined or otherwise formed for relief volumes and weight reduction apertures, step 806. For the embodiment shown, the fan blisk is mounted on a fan shaft and spaced from an engine core by a pressure plate to form a plenum, step 808. A concentric spinner with inner cap and outer toroidal cap is mounted to the inner and outer hubs respectively, step 810, to accelerate flow as it enters the secondary flow blades. A secondary flow path, in the embodiment shown, a gear case shroud, is provided for direction of secondary flow, step 812. For the embodiment shown, the secondary flow is directed by the gear case shroud around a gear case for cooling and airflow received into the plenum is directed into the gear case by a cooling fan, step 814. A diffuser is provided for directing secondary flow exiting the gear case shroud, step 816, and mixing with thrust flow exiting the nacelle, step 818. A tail cone is provided having inlets positioned to receive exit flow from the diffuser, step 820, to provide inlet combustion air for the reverse flow turbine engine, step 822.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A ducted fan comprising:
   a reverse flow turbine engine core;
   a fan blisk driven by the engine core, the fan blisk incorporating
      a set of thrust fan blades extending from an outer hub;
      a set of integral secondary flow blades extending intermediate an inner hub and the outer hub;
   a nacelle providing an outer flow duct for the thrust fan blades; and,
   a gear case shroud having an inlet concentric with the outer hub carrying flow from the integral secondary flow blades;
   a flange in the inner hub, said flange and gear case shroud forming a plenum for secondary air for cooling of components of the reverse flow turbine engine core;
      an air diffuser extending from the gear case shroud wherein at least a portion of said secondary air flows over an outer profile of the engine core, and,
      a tail cone having inlets positioned to receive exit flow from the diffuser to provide inlet combustion air for the reverse flow turbine engine.

2. The ducted fan of claim 1 wherein the reverse flow turbine engine core includes a power shaft driven through a gear case and having a fan attachment shaft for the fan blisk.

3. The ducted fan of claim 2 wherein the gear case shroud includes a plurality of interconnected base gores for stator blades extending to the nacelle.

4. The ducted fan of claim 1 further comprising a concentric spinner engaging the inner and outer hub for secondary air flow.

5. The ducted fan of claim 2 further comprising:
   a pressure plate spaced from the gear case and engaging the flange in the fan blisk supported by the inner hub, said flange, shroud and gear case forming a plenum for cooling air for a cooling fan on the gear case.

6. The ducted fan of claim 5 wherein the flange includes volume recesses and weight reduction apertures connecting the plenum to an interior of the spinner for increased effective volume of the plenum.

7. A reverse flow turbine ducted fan comprising:
   a reverse flow turbine engine core including a power shaft driven through a gear case and having a fan attachment shaft;
   a fan blisk attached to the fan attachment shaft and spaced from the gear case by a pressure plate engaging a flange, the fan blisk incorporating
      a set of thrust fan blades extending from an outer hub;
      a set of integral secondary flow blades extending intermediate an inner hub and the outer hub, the flange spanning the inner hub, said gear case and flange forming a cooling air plenum;
   a nacelle providing an outer flow duct for primary air flow from the thrust fan blades; and,
   a plurality of interconnected base gores for stator blades extending to the nacelle forming a gear case shroud aligned with the outer hub and carrying secondary air flow from the integral secondary flow blades;
   an air diffuser extending from the gear case shroud wherein at least a portion of said secondary air flows over an outer profile of the engine core;
   a tail cone having inlets positioned to receive exit flow from the diffuser to provide inlet combustion air for the reverse flow turbine engine; and,
   a concentric spinner engaging the inner and outer hub for secondary air flow.

8. A method for providing airflow from a ducted fan in a reverse flow turbine engine comprising:
   forming thrust blades intermediate an outer hub and a nacelle inner radius in a fan blisk;
   forming secondary flow blades intermediate an inner hub and the outer hub;
   mounting the fan blisk on a fan shaft spaced from an engine core by a pressure plate to form a plenum; and
   providing a nacelle for flow from the thrust blades; and,
   providing a secondary flow path for secondary air flow from the secondary flow blades for directing cooling air to components of the turbine engine, said secondary flow path including an air diffuser extending from a gear case shroud;

providing at least a portion of said secondary air flow over an outer profile of the engine core, and, positioning a tail cone having inlet s to receive exit flow from the diffuser to provide inlet combustion air for the reverse flow turbine engine.

9. The method of claim 8 further comprising:

forming an attachment flange engaging the inner hub including relief volumes and weight reduction apertures.

10. The method of claim 8 further comprising:

mounting a concentric spinner with inner cap and outer toroidal cap to the inner and outer hubs respectively for entraining flow into the secondary flow blades.

11. The method of claim 10 further comprising:

directing secondary flow around a gear case for cooling;

receiving secondary airflow into the plenum; and drawing secondary flow into the gear case by a cooling fan.

12. A method to improve operation of a reverse flow turbine engine comprising:

providing a fan blisk with primary air flow and secondary air flow;

routing primary flow from the blisk through a nacelle for thrust;

routing secondary flow from the blisk through a plenum;

employing airflow from the plenum for cooling a gear case of the reverse flow turbine engine;

supporting the plenum as a gear case shroud with stators extending from the nacelle;

flowing at least a portion of the secondary flow over an outer profile of the engine core through an air diffuser extending from the gear case shroud; and receiving exit flow from the diffuser through inlets in a tail cone for inlet combustion air for the reverse flow turbine engine.

13. The method of claim 12 wherein providing a fan blisk with primary air flow and secondary air flow includes forming thrust flow blades on the blisk between an outer hub and the nacelle and forming secondary flow blades on the blisk between an inner and outer hub.

14. The method of claim 13 further comprising providing a concentric spinner engaging the inner and outer hub for secondary air flow.

\* \* \* \* \*